(12) United States Patent
King et al.

(10) Patent No.: US 7,061,131 B2
(45) Date of Patent: Jun. 13, 2006

(54) METHOD AND SYSTEM FOR OPTIMIZING ENERGY STORAGE IN HYBRID OFF-HIGHWAY VEHICLE SYSTEMS AND TROLLEY CONNECTED OHV SYSTEMS

(75) Inventors: Robert Dean King, Schenectady, NY (US); Lembit Salasoo, Schenectady, NY (US); Ajith Kuttannair Kumar, Erie, NY (US); Henry Todd Young, North East, NY (US)

(73) Assignee: General Electric Company, Niskayuna, NY (US)

( * ) Notice: Subject to any disclaimer, the term of this patent is extended or adjusted under 35 U.S.C. 154(b) by 110 days.

(21) Appl. No.: 10/250,220

(22) Filed: Jun. 13, 2003

(65) Prior Publication Data

US 2004/0251691 A1 Dec. 16, 2004

(51) Int. Cl.
*B60L 11/00* (2006.01)
*F02N 11/06* (2006.01)
*B60K 41/12* (2006.01)

(52) U.S. Cl. ............ 290/40 C; 290/4 A; 290/4 B; 290/4 C; 290/4 R

(58) Field of Classification Search ............ 290/4 R, 290/4 A–4 C, 40 C
See application file for complete search history.

(56) References Cited

U.S. PATENT DOCUMENTS

| 3,566,717 A * | 3/1971 | Berman et al. ............ 477/3 |
| 3,732,751 A * | 5/1973 | Berman et al. ............ 475/2 |
| 4,217,529 A * | 8/1980 | Bourke et al. ............ 388/806 |
| 4,363,999 A * | 12/1982 | Preikschat ............ 318/53 |
| 4,951,769 A * | 8/1990 | Kawamura ............ 180/65.4 |
| 5,283,470 A * | 2/1994 | Hadley et al. ............ 290/45 |
| 5,334,919 A | 8/1994 | Willard ............ 318/375 |
| 5,343,970 A * | 9/1994 | Severinsky ............ 180/65.2 |
| 5,345,971 A * | 9/1994 | Elgar et al. ............ 138/98 |
| 5,396,214 A * | 3/1995 | Kumar ............ 338/279 |
| 5,517,093 A | 5/1996 | Augustynaik et al. ............ 318/63 |
| 5,621,304 A * | 4/1997 | Kiuchi et al. ............ 322/18 |
| 5,669,470 A * | 9/1997 | Ross ............ 191/10 |
| 5,710,699 A * | 1/1998 | King et al. ............ 363/132 |
| 5,828,201 A | 10/1998 | Hoffman et al. ............ 320/104 |
| 5,929,595 A * | 7/1999 | Lyons et al. ............ 320/104 |
| 5,971,092 A * | 10/1999 | Walker ............ 180/308 |
| 5,999,864 A * | 12/1999 | Thiel et al. ............ 701/22 |
| 6,005,358 A * | 12/1999 | Radev ............ 318/139 |
| 6,022,290 A * | 2/2000 | Lyon ............ 477/108 |
| 6,026,921 A * | 2/2000 | Aoyama et al. ............ 180/65.2 |

(Continued)

FOREIGN PATENT DOCUMENTS

EP     1 245 431 A2     10/2002

*Primary Examiner*—Darren Schuberg
*Assistant Examiner*—Pedro J. Cuevas
(74) *Attorney, Agent, or Firm*—Fletcher Yoder

(57) ABSTRACT

A hybrid energy system for propelling an off-highway vehicle includes an engine rated at a first power capacity, and a power converter driven by the engine for providing primary electric power. A traction motor system receives the primary electric power, the traction motor system propelling the off-highway vehicle in response to the primary electric power, and the traction motor system further including a dynamic braking mode of operation. An energy storage medium captures electrical energy generated by the traction motor system in the dynamic braking mode of operation, the energy storage medium transferring a portion of the captured energy to the traction motor system to augment the primary electric power, wherein the traction motor system is rated at a second power capacity exceeding the first power capacity.

30 Claims, 4 Drawing Sheets

U.S. PATENT DOCUMENTS

| | | | |
|---|---|---|---|
| 6,442,455 B1 * | 8/2002 | Kotre et al. | 701/22 |
| 6,486,268 B1 * | 11/2002 | Zook et al. | 525/535 |
| 6,590,299 B1 * | 7/2003 | Kuang et al. | 290/40 C |
| 6,591,758 B1 * | 7/2003 | Kumar | 105/35 |
| 6,603,215 B1 * | 8/2003 | Kuang et al. | 290/40 C |
| 6,608,396 B1 * | 8/2003 | Downer et al. | 290/40 C |
| 6,612,245 B1 * | 9/2003 | Kumar et al. | 105/26.05 |
| 6,612,246 B1 * | 9/2003 | Kumar | 105/34.2 |
| 6,615,118 B1 * | 9/2003 | Kumar | 701/19 |
| 6,664,651 B1 * | 12/2003 | Kotre et al. | 290/29 |
| 6,683,389 B1 * | 1/2004 | Geis | 290/40 C |
| 6,812,670 B1 * | 11/2004 | Minamiura et al. | 320/116 |
| 6,853,893 B1 * | 2/2005 | Corcione et al. | 701/22 |
| 6,879,889 B1 * | 4/2005 | Ross | 701/22 |
| 6,885,920 B1 * | 4/2005 | Yakes et al. | 701/22 |
| 6,914,410 B1 * | 7/2005 | Morgante et al. | 318/801 |
| 6,973,880 B1 * | 12/2005 | Kumar | 105/35 |
| 2002/0177929 A1 | 11/2002 | Kumar | 701/19 |

* cited by examiner

METHOD AND SYSTEM FOR OPTIMIZING ENERGY STORAGE IN HYBRID OFF-HIGHWAY VEHICLE SYSTEMS AND TROLLEY CONNECTED OHV SYSTEMS

BACKGROUND OF THE INVENTION

The present disclosure relates generally to hybrid, off-highway vehicle (OHV) and trolley systems and, more particularly, to a method and system for optimizing energy storage in hybrid off-highway vehicle and trolley connected OHV systems.

Off-highway (OHV) vehicles, including trolley connected OHVs and other large traction vehicles, are commonly powered by electric traction motors coupled in driving relationship to one or more axles or motor-wheel sets of the vehicle. In the motoring or traction mode of operation, the traction motors are supplied with electric current from a controllable source of electric power (e.g., an engine-driven traction alternator/rectifier/inverter combination or, alternatively, a direct current drive source including a dc motor without an inverter) and apply torque to the vehicle wheels which exert tangential force or tractive effort on the surface on which the vehicle is traveling (e.g., a haulage track or road), thereby propelling the vehicle in a desired direction along the right of way.

Conversely, in an electrical (i.e., dynamic) braking mode of operation, the same motors serve as axle-driven/wheel-driven electrical generators. Torque is applied to the motor shafts by their respectively associated axle-wheel sets which then exert braking effort on the surface, thereby retarding or slowing the vehicle's progress. Because there is no suitable storage medium for the resulting generated electrical energy in a conventional off-highway vehicle or trolley connected OHV, an electrically resistive grid (known as a dynamic braking grid or load box) is used to convert the electrical energy into heat energy, which is then vented to the atmosphere.

In contrast, hybrid OHVs and hybrid trolley connected OHVs have the capability of storing the generated dynamic braking energy in a suitable storage element(s) such as batteries, flywheels, ultracapacitors and the like,. This stored energy may then be used for traction and/or auxiliary systems in the OHV, thereby improving fuel efficiency. However, regardless of whether an OHV includes power storage elements and/or energy dissipative elements, such components contribute to the overall size and weight of the vehicle and thus to the costs of the vehicle. As such, it is desirable to be able to provide an OHV with energy storage capability for fuel savings while also reducing the size of the associated components (e.g., engine and dynamic brake resistors, etc.), which could then result in greater payload capability.

In addition, trolley connected OHVs should also have full engine capability in order to motor around breaks in the trolley line (as well as around other OHVs that may have broken down), and also to maneuver in or around haul road sections, loading and unloading areas, and maintenance facilities where the trolley lines have not been provided. A trolley line may also be electrically weak at the ends of the line where it is unable to provide full OHV motoring power requirement, thereby necessitating the use of the diesel engine. In a dynamic braking mode, if the trolley connected OHV send braking energy back onto the trolley line, another trolley connected OHV must be available to used/dissipate the energy. Otherwise, the braking energy must be dissipated in the trolley connected OHV's braking grid.

Thus, for trolley connected OHVs, it is further desirable to be able to reduce the engine and/or braking grid sizes, while still maintaining full motoring and braking capability, in the event that the trolley line is unable to provide the full OHV energy requirement and/or accept the full OHV braking energy generation.

BRIEF DESCRIPTION OF THE INVENTION

The above discussed and other drawbacks and deficiencies of the prior art are overcome or alleviated by a hybrid energy system for propelling an off-highway vehicle. In an exemplary embodiment, the system includes an engine rated at a first power capacity, and a power converter configured to be driven by the engine for providing primary electric power. A traction motor system receives the primary electric power, the traction motor system configured for propelling the off-highway vehicle in response to the primary electric power, and the traction motor system further including a dynamic braking mode of operation. An energy storage medium is configured for capturing electrical energy generated by the traction motor system in the dynamic braking mode of operation, the energy storage medium transferring a portion of the captured energy to the traction motor system to augment the primary electric power, wherein the traction motor system is rated at a second power capacity exceeding the first power capacity.

In another aspect, a method for operating a hybrid energy system configured for propelling an off-highway vehicle includes receiving a traction input command and determining whether a resulting power demand on a traction motor system of the off-highway vehicle exceeds a first power capacity of an engine included in the hybrid energy system, the engine supplying primary electric power to the traction motor system. The primary electric power is supplemented with captured electrical energy stored in an energy storage medium whenever the power demand exceeds the first power capacity.

In still another aspect, a hybrid energy system for propelling a trolley connected, off-highway vehicle a trolley power source, and a trolley line for coupling primary electric power to a traction motor system. The traction motor system is configured for propelling the trolley connected off-highway vehicle response to the primary electric power, the traction motor system further including a dynamic braking mode of operation. In addition, an engine is rated at a first power capacity, and a power converter is configured to be driven by the engine, the power converter for providing secondary electric power to the traction motor system. An energy storage medium captures electrical energy generated by the traction motor system in the dynamic braking mode of operation, the energy storage medium transferring a portion of the captured energy to the traction motor system to augment one of the primary electric power and the secondary electric power. The traction motor system is rated at a second power capacity exceeding the first power capacity.

In still another aspect, a method for operating a hybrid energy system configured for propelling a trolley connected, off-highway vehicle includes determining the availability of a trolley line for providing primary electric power to a traction motor system of the trolley. If the trolley line is not available, it is determined whether a power demand on the traction motor system exceeds the capacity of an energy storage medium of the system. An engine for providing secondary electric power to the traction motor system is activated if the primary electric power is not available and the power demand on the traction motor system exceeds the capacity of the energy storage medium. It is further determined whether a power demand on the traction motor system exceeds the capacity of primary power available from the trolley line if the engine is not activated, and it is determined whether the power demand on the traction motor system exceeds a first power capacity of the engine if the engine is activated to supply secondary electric power to the traction motor system. The primary or secondary electric power is supplemented with captured electrical energy stored in an energy storage medium, the captured energy being generated by the traction motor system during a dynamic braking mode of operation.

In still another aspect, an energy system for propelling an off-highway vehicle includes an energy storage medium configured for providing primary electric power. A traction motor system is configured for receiving the primary electric power and for propelling the off-highway vehicle in response to the primary electric power. The traction motor system further includes a dynamic braking mode of operation, wherein the energy storage medium is further configured for capturing electrical energy generated by the traction motor system in the dynamic braking mode of operation.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is a method for optimizing energy storage in hybrid off-highway vehicle (OHV) and trolley connected OHV systems. Briefly stated, the present disclosure addresses an improved hybrid OHV design in which the stored braking energy is combined with the energy of the OHV's engine to supply the tractive power for the vehicle. In other words, the power management of the hybrid OHV system is deliberately designed to draw less power from the diesel engine than is required for traction, with the remaining power being provided by the hybrid energy storage elements. In so doing, the size and/or weight of the engine and other power components may be reduced. This in turn reduces the overall weight/size of the empty OHV, and allows for additional payload capability. For trolley-connected applications, further performance improvements (in addition to the size/weight reductions) during trolley operation are also realized, as described in greater detail hereinafter. While the exemplary embodiments depicted hereinafter are described in terms of hybrid OHV's and trolley connected vehicles, it should be understood that the principles herein are equally applicable to other types of vehicles including, but not limited to, railroad and transit locomotives (including both self-powered electromotive locomotives and all-electric locomotives powered by electrified third rails or overhead lines), on-road vehicles and other vehicles capable of connection to external power sources such as electrified third rails.

Figure 1:
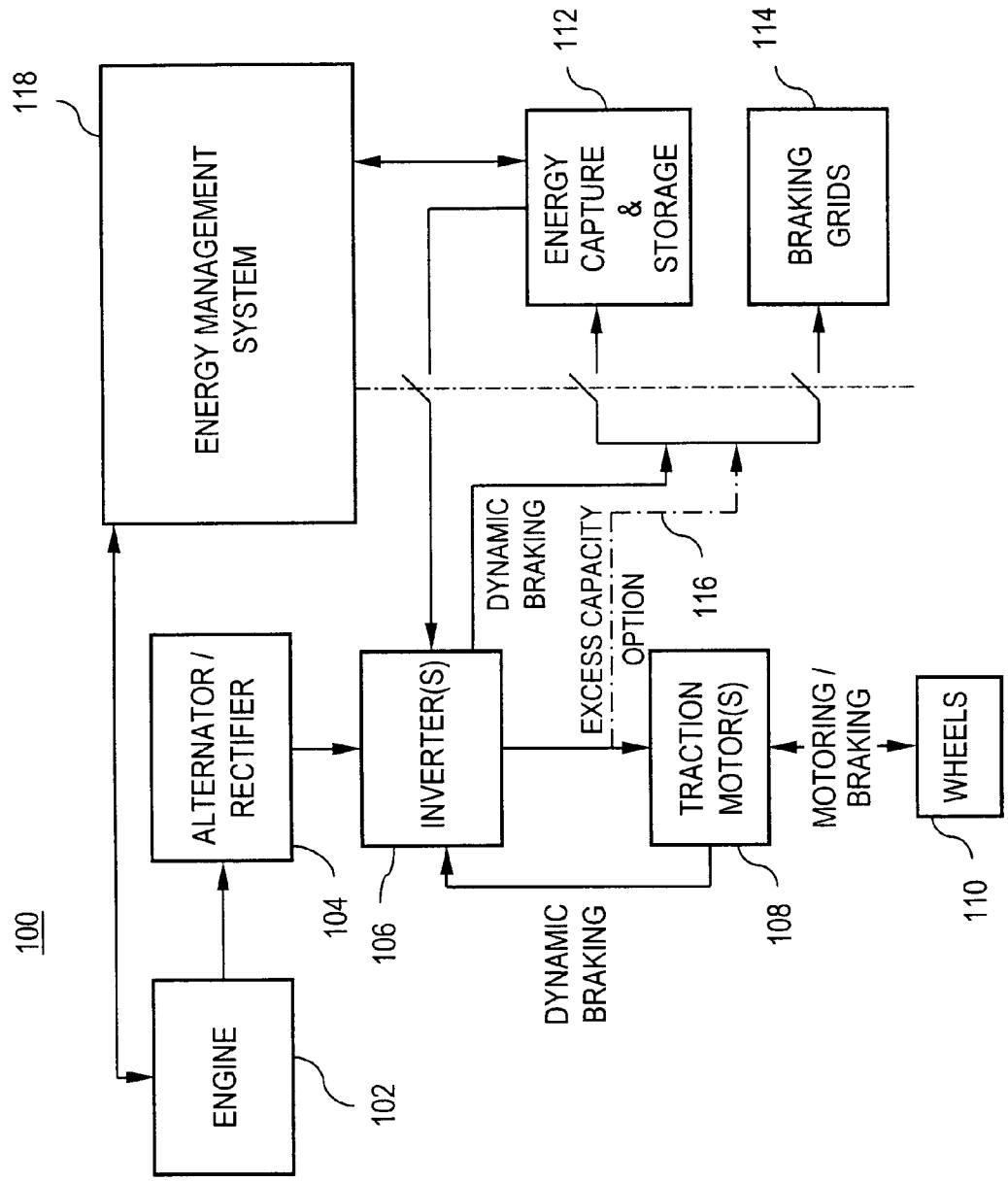
FIG. 1 is a system-level block diagram of an exemplary energy generation and storage system for hybrid OHVs, suitable for use in accordance with an embodiment of the invention.

Referring initially to FIG. 1, there is shown a system-level block diagram of an exemplary energy generation and storage system 100 hybrid OHVs, suitable for use in accordance with an embodiment of the invention. As illustrated in FIG. 1, a diesel engine 102 drives a prime mover power source 104 (e.g., an alternator/rectifier combination). The prime mover power source 104 preferably supplies DC power to a power converter (e.g., an inverter) 106 that provides three-phase AC power to a traction motor 108. It should be understood, however, that the system 100 illustrated in FIG. 1 can be modified to operate with DC traction motors as well. In addition, one skilled in the art will appreciate that the system 100 could be further simplified by utilizing, for example, a generator in lieu of alternator/rectifier 104 and also in lieu of inverters 106 for a DC output.

In one possible embodiment, there is a plurality of traction motors (e.g., one per axle or wheel set), with each axle/wheel set being coupled to a plurality of OHV wheels. In other words, each traction motor 108 may include a rotatable shaft coupled to the associated axle for providing tractive power to the wheels. Thus, each OHV traction motor 108 provides the necessary motoring force to an associated one or more OHV wheels 110 to cause the OHV to move. Such OHVs may include, for example, large excavators, excavation dump trucks, and the like. By way of further example, such large excavation dump trucks may utilize motorized wheels such as the GEB23â□¢ motorized wheel employing the GE150ACâ□¢ drive system (both of which are available from the assignee of the present invention).

When the traction motors 108 are operated in a dynamic braking mode, at least a portion of the generated electrical power is routed to an energy storage medium 112, such as described earlier. To the extent that the energy storage medium 112 is unable to receive and/or store all of the dynamic braking energy, the excess energy may be routed to braking grids 114 for dissipation as heat energy. In addition, during periods when the engine 102 is being operated such that it provides more energy than needed to drive traction motors 108, the excess capacity (also referred to as excess prime mover electric power) may be optionally stored in energy storage medium 112. Thus, the energy storage medium 112 can be charged at times other than when the traction motors 108 are operating in the dynamic braking mode. This "excess capacity" aspect of the system 100 is illustrated in FIG. 1 by a dashed line 116.

The energy storage medium 112 of FIG. 1 may include at least one of the following storage subsystems for storing the electrical energy generated during the dynamic braking mode: a battery subsystem, a flywheel subsystem, or an ultra-capacitor subsystem. However, other storage subsystems are also contemplated. In addition, these storage subsystems may be used separately or in combination. When used in combination, the storage subsystems can provide synergistic benefits not realized with the use of a single energy storage subsystem. A flywheel subsystem, for example, typically stores energy relatively fast but may be relatively limited in its total energy storage capacity. A battery subsystem, on the other hand, often stores energy relatively slowly but can be constructed to provide a relatively large total storage capacity. Hence, a flywheel subsystem may be combined with a battery subsystem wherein the flywheel subsystem captures the dynamic braking energy that cannot be timely captured by the battery subsystem. The energy thus stored in the flywheel subsystem may be thereafter used to charge the battery. Accordingly, the overall capture and storage capabilities are preferably extended beyond the limits of either a flywheel subsystem or a battery subsystem operating alone. Such synergies can further be extended to combinations of other storage subsystems, such as a battery and ultra-capacitor in combination where the ultra-capacitor supplies the peak demand needs.

The system 100 additionally includes an energy management system 118 for controlling the storage and regeneration of energy. As illustrated, the energy management system 118 is configured to receive data from the energy storage medium 112 and engine 102 (and optionally from traction motors 108). Energy management system 118 may include therein a data processor (not shown), associated database (not shown) and, optionally, a position identification system (not shown) such as a global positioning satellite system receiver (GPS). Based upon such input data, the energy management system 118 also issues appropriate control commands to control the flow of energy to and from the energy storage medium 112, to the inverters 106 and to the braking grids 114.

As discussed previously, the size and weight of an OHV engine and its associated support systems is one of the significant factors in the overall cost and maintenance of the OHV. In conventionally designed systems, the OHV engines typically come in discrete sizes, depending upon the load capacity of the vehicle. Thus, for example, a 360-ton truck may include a 3500 horsepower (HP) engine outfitted therewith, whereas a 300-ton truck might utilize a smaller, 2700 HP engine. As a 2700 HP engine and its associated peripherals are significantly lighter, smaller and cheaper (and possibly also has a significantly lower failure rate due to higher volume production) than the 3500 HP counterpart, it would be beneficial to be able to utilize the smaller engine in the heavier, 360-ton vehicle.

Therefore, in accordance with a embodiment of the invention, a hybrid energy system for OHVs such as illustrated above is disclosed, wherein the engine 102 is sized at a first power capacity, while both the inverter(s) 106 and traction motor(s) 108 are sized at a second power capacity, the second power capacity exceeding the first power capacity. Thus, for example, with a hybrid 360-ton vehicle a smaller, 2700 HP engine may be used to provide primary electric power for the inverter(s) and traction motor(s) rated at a higher, 3500 HP capacity in a motoring mode of operation. Moreover, in a dynamic braking mode, the inverter(s) and traction motor(s) may be rated at an even higher value (e.g., 5000 HP). Any power shortfall is then compensated by the OHV energy storage medium, which is rated at a third power capacity sufficient to provide the additional 800 HP for a high demand period. The particular storage device(s) of the energy storage medium 112 are charged during dynamic braking, as well as during light motoring or idle operation.

The degree to which the second power capacity of the inverter/traction motors exceeds the first power capacity of the engine may vary greatly, depending upon the intended OHV application. In OHV applications featuring significant downhill topographies, it is possible to reduce the engine horsepower even further with respect to the inverter/traction motor power capacity, and conceivably to the point of eliminating the engine altogether. In such extreme downhill applications, the energy storage medium may be rated to produce the fully rated horsepower required for the relatively small periods of time when an emptied OHV travels back uphill or on flat grades.

Figure 2:
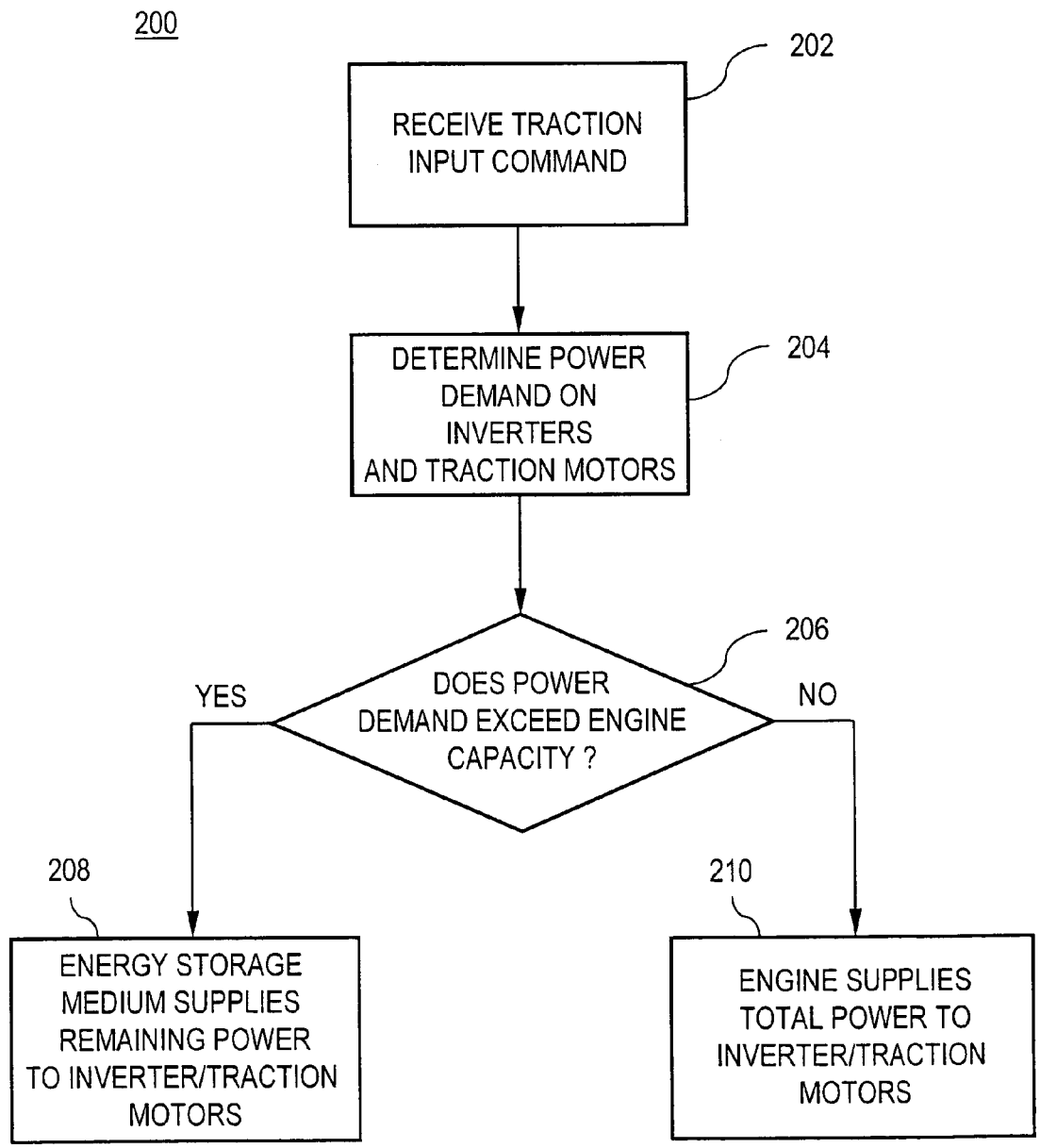
FIG. 2 is flow diagram illustrating a method for operating a hybrid energy system for propelling an off-highway vehicle, in accordance with a further aspect of the invention.

FIG. 2 is a flow diagram illustrating a method 200 for operating a hybrid energy system for propelling an off-highway vehicle, in accordance with a further aspect of the invention. As is shown at block 202, a traction input command is received (such as by the energy management system 118). This command may be represented, for example, by an operator input to an OHV accelerator pedal. Based on operator input, the system 100 is able to determine the power demand on the inverter(s) 106 and traction motor(s) 108, as shown in block 204. If this tractive power demand exceeds the capacity of the engine 102, as determined at decision block 206, then the energy storage medium 112 will supply the remaining power needed to the inverter(s) and traction motor(s), as shown in block 208. Otherwise, the engine 102 provides all of the power needed to produce tractive effort, as indicated in block 210.

Alternatively, the method 200 could be implemented in a manner such that, regardless of the power demand by the inverters and traction motors, only a portion of this power is drawn from the engine, while the remaining portion is drawn from the energy storage medium. In either case, this approach allows for the OHV to be configured with a smaller engine.

As was also indicated previously, during dynamic braking, the energy in conventional OHVs is typically dissipated in resistive grids. For example, 4 to 5 parallel resistive grid elements may be used to dissipate the generated braking energy, wherein each of these parallel elements typically dissipates about 1000 HP of energy. Thus, in accordance with still another aspect of the present invention, the hybrid OHV system is further designed such that one or more of these resistive grid elements 114 are "eliminated" without any performance degradation. In an exemplary embodiment, a single grid element reduction dictates that the energy storage medium 112 should have a corresponding increased storage capacity for the maximum dynamic braking operations.

In other words, although the inverters and traction motors are rated for the maximum dynamic braking load of the OHV, the braking grid elements 114 are deliberately selected to have a lower overall power rating (e.g., by using smaller elements or eliminating one or more elements). The deficit in the resulting energy dissipation capability is then made up by increasing the energy storage capacity of the storage medium 112, wherein dynamic braking energy in excess of the grid element capacity is stored within the storage medium 112. The energy stored in the storage medium 112 could then be dissipated during motoring or even during lighter braking periods.

Figure 3:
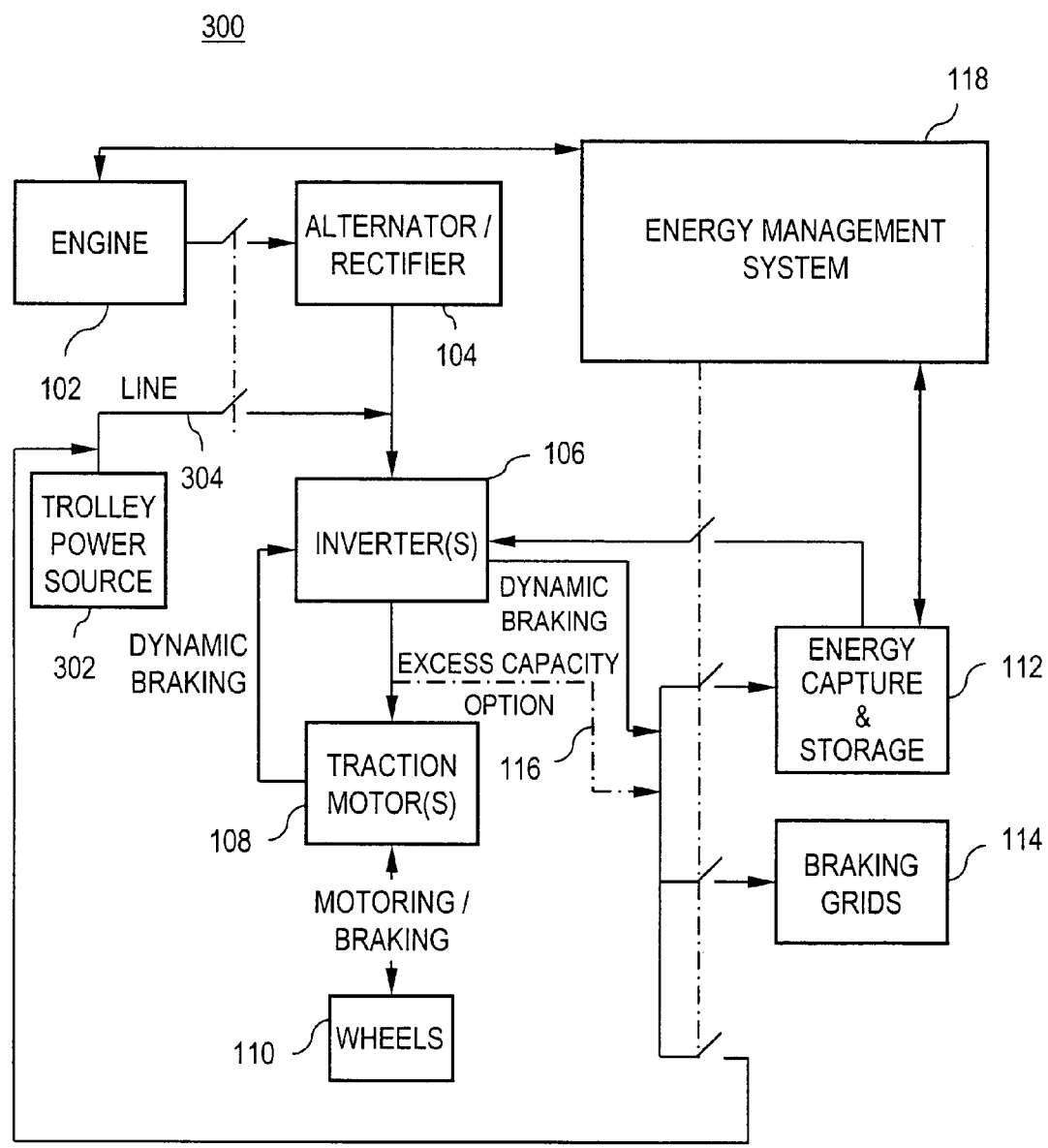
FIG. 3 is a system-level block diagram of another embodiment of the energy generation and storage system of FIG. 1, particularly adapted for a trolley connected OHV application.

Referring now to FIG. 3, there is shown a system-level block diagram 300 of another embodiment of the energy generation and storage system of FIG. 1, particularly adapted for a trolley application. In contrast to the embodiment of FIG. 1, the trolley hybrid system 300 has a trolley power source 302 as its primary tractive power source, which may be in the form of an overhead electrical line through which the trolley remains in moving contact along a determined path. However, the engine 102 (e.g., a diesel engine) is still included within the system as a backup supply in the event that direct contact to the trolley line becomes unavailable or the trolley power is interrupted.

With a conventional off-highway trolley vehicle system, the tractive power is provided entirely by the trolley line in a normal operating mode, while the engine is not activated to provide tractive power. However, if the trolley power is interrupted as described above, the engine is then activated in order to provide all of the tractive power. Additionally, during dynamic braking, the power generated by the traction motors and inverters may be dissipated through the braking grids or, if the trolley line is "receptive", the power can be sent back to the trolley line in certain instances. In any case, the engine 102 is conventionally selected at a full power rating in accordance with the rating of the inverters and traction motors.

Therefore, in accordance with still another aspect of the present invention, a hybrid energy system for trolley applications is disclosed wherein the engine 102 is sized at a first power capacity, while both the inverter(s) 106 and traction motor(s) 108 are sized at a second power capacity, the second power capacity exceeding the first power capacity. In a nominal mode of operation, tractive power to the inverter(s) 106 and traction motor(s) 108 is supplied by the trolley power source 302 through trolley line 304. In the event the trolley power source 302 or connection to the trolley line 304 becomes temporarily unavailable, the engine 102 supplies tractive power. If the demand exceeds the engine capacity, then the energy storage medium 112 provides the remaining power, similar to the OHV embodiment of FIG. 1.

There may also be an instance in which the trolley power along is insufficient to meet the demand of the traction motors. This could occur, for example, in a "weak" trolley line, wherein the location of the contacted portion of the trolley line 304 is relatively remote with respect to the location of the trolley power source 302. In such a situation, the energy storage medium 112 may be used to provide supplemental power to meet the traction requirements. Accordingly, the energy storage medium is sized at a third power capacity sufficient to compensate for any difference between the available trolley line power and the second power capacity of the inverter(s) 106 and traction motor(s) 108.

In addition, the trolley hybrid system 300 provides still another option for dissipating dynamic braking energy. As mentioned earlier, the dynamic braking energy generated by the traction motor(s) 108 may be directed back onto the trolley line 304, if the line is receptive. Accordingly, FIG. 3 further illustrates a schematic connection of the dynamic braking energy to the trolley line 304, as controlled by the energy management system 118. If the trolley line is insufficiently receptive to dynamic braking energy, then all or a portion of the energy may be stored in the energy storage medium 112 and/or dissipated through the resistive braking grids 114. As such, both the energy storage medium 112 and resistive braking grids 114 are sized for this capability.

Figure 4:
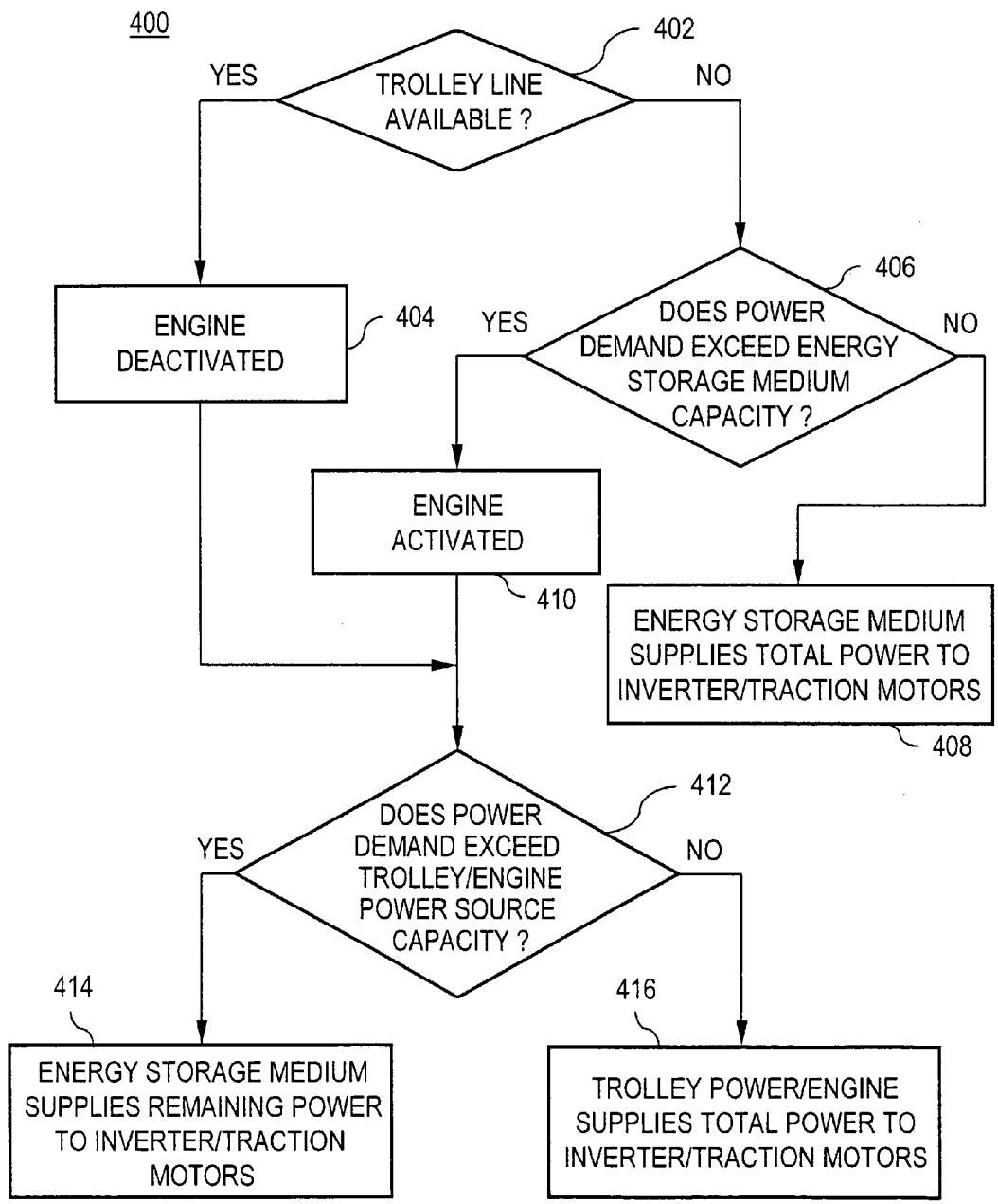
FIG. 4 is a flow diagram illustrating a method for operating a trolley connected hybrid energy system, in accordance with a further aspect of the invention.

Finally, FIG. 4 is a flow diagram illustrating a method 400 for operating a trolley hybrid energy system, in accordance with a further aspect of the invention. The method 400 begins with a query at decision block 402, in which it is determined whether power on the trolley line is available. If so, then the engine 102 will remain deactivated, as shown at block 404. However, if the trolley line power is not available (such as for reasons exemplified above), then method 400 further proceeds to decision block 406 to determine whether the demanded tractive power exceeds the capability of the energy storage medium 112. For example, if the trolley connected OHV were moving around breaks in the trolley line and/or inside a workshop, it may be that the energy storage medium (e.g., a battery) can meet the tractive power demand by itself, thus avoiding the need to start the engine. If this is the case, method proceeds to block 408, wherein the energy storage medium 112 supplies the full amount of power to the inverter/traction motors.

On the other hand, if the power demand exceeds the capability of the energy storage medium 112, then the engine 102 is activated as shown at block 410. Then, regardless of whether the trolley line is available or whether the engine is activated, the method 400 proceeds to decision block 412, where it is determined whether the demanded tractive power exceeds the capacity of the applicable source (i.e., either the trolley line or the engine). In a normal mode of operation, this inquiry essentially determines whether the trolley is located at a "weak" point on the line such that it cannot provide the full amount of tractive power. In the case where the engine is used, this inquiry determines whether the demanded power exceeds the first power capacity of the engine (which again is less than the second capacity of the inverters and motors).

Regardless of the source of power used, if the demand exceeds the capacity, then method proceeds to block 414, where the energy storage medium 112 provides the remaining power to the inverter/traction motors. Otherwise, the applicable power source (either the trolley power source 302 or the engine 102) handles the power demand, as reflected in block 416. As is the case with the OHV embodiment, the energy management system 118 could alternatively be programmed such that the energy storage medium 112 always supplies at least a portion of the demanded tractive power. This method of operation therefore allows for a smaller sizing of components to for increased payload capability.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A hybrid energy system for propelling an off-highway vehicle, comprising:
   an engine, said engine rated at a first power capacity, the engine not being mechanically coupleable to drive wheels of the vehicle;
   a power converter configured to be driven by said engine for providing primary electric power;
   a traction motor system configured for receiving said primary electric power and for propelling the off-highway vehicle in response to said primary electric power, and said traction motor system further including a dynamic braking mode of operation; and
   an energy storage medium configured for capturing electrical energy generated by said traction motor system in said dynamic braking mode of operation, said energy storage medium transferring a portion of said captured energy to said traction motor system to augment said primary electric power;
   wherein said traction motor system is rated at a second power capacity exceeding said first power capacity.

2. The hybrid energy system of claim 1, wherein said second power capacity corresponds to a load carrying capacity of the off-highway vehicle.

3. The hybrid energy system of claim 2, wherein said power converter is also rated at said second power capacity.

4. The hybrid energy system of claim 3, wherein said second power capacity has a first value in a motoring mode of operation and a second value in said dynamic braking mode of operation.

5. The hybrid energy system of claim 4, wherein said energy storage medium is rated at a third capacity, said third capacity being sufficient to make up the difference between said first power capacity and said first value of said second power capacity.

6. The hybrid energy system of claim 4, further comprising a dynamic braking grid system configured for dissipating electrical energy generated by said traction motor system not captured by said energy storage medium, said dynamic braking system further being rated at a lower power dissipation capacity with respect to said second value of said second power capacity.

7. The hybrid energy system of claim 6, wherein said dynamic braking grid system with lower power dissipation capacity is configured to dissipate energy generated by said traction motor system in excess of said third capacity of said energy storage medium.

8. A method for operating a hybrid energy system configured for propelling an off-highway vehicle, the method comprising:
receiving a traction input command;
determining whether a resulting power demand on a traction motor system of the off-highway vehicle exceeds a first power capacity of an engine included in the hybrid energy system, said engine supplying primary electric power to said traction motor system, the engine not being mechanically coupleable to drive wheels of the vehicle; and
supplementing said primary electric power with captured electrical energy stored in an energy storage medium whenever said power demand exceeds said first power capacity.

9. The method of claim 8, wherein said captured electrical energy stored in said energy storage medium is generated by at least one of: said traction motor system during a dynamic braking mode of operation and said engine.

10. The method of claim 9, wherein said traction motor system is rated at a second power capacity exceeding said first power capacity, said second power capacity corresponding to a load carrying capacity of the off-highway vehicle.

11. The method of claim 10, wherein said energy storage medium is rated at a third capacity, said third capacity being sufficient to make up the difference between said first power capacity and said second power capacity.

12. The method of claim 9, further comprising:
determining whether dynamic braking energy generated during said dynamic braking mode of operation exceeds an energy dissipation capacity of a dynamic braking grid system included within the hybrid energy system; and
storing dynamic braking energy in excess of said energy dissipation capacity of said dynamic braking grid system within said energy storage medium.

13. The method of claim 12, wherein said energy dissipation capacity of said dynamic braking grid system is selected to be less than an energy generation capacity of said traction motor system during said dynamic braking mode of operation.

14. A hybrid energy system for propelling a vehicle powered by both an external electrical power source and an on-board engine, comprising:
an external electrical power source;
a connector configured for coupling the external electric power to a traction motor system;
said traction motor system configured for propelling the vehicle in response to said primary electric power, and said traction motor system further including a dynamic braking mode of operation;
an engine on-board the vehicle, said engine rated at a first power capacity, the engine not being mechanically coupleable to drive wheels of the vehicle;
a power converter configured to be driven by said engine, said power converter for providing secondary electric power to said traction motor system; and
an energy storage medium configured for capturing electrical energy, said energy storage medium further configured for transferring a portion of said captured energy to said traction motor system to augment one of said primary electric power and said secondary electric power;
wherein said traction motor system is rated at a second power capacity exceeding said first power capacity.

15. The hybrid energy system of claim 14, wherein said captured electrical energy is generated by at least one of: said traction motor system in said dynamic braking mode of operation, said engine, and said trolley line.

16. The hybrid energy system of claim 15, wherein said second power capacity corresponds to a load carrying capacity of the trolley connected vehicle.

17. The hybrid energy system of claim 16, wherein said power converter is also rated at said second power capacity.

18. The hybrid energy system of claim 17, wherein said second power capacity has a first value in a motoring mode of operation and a second value in said dynamic braking mode of operation.

19. The hybrid energy system of claim 18, further comprising a dynamic braking grid system configured for dissipating electrical energy generated by said traction motor system not captured by said energy storage medium, said dynamic braking system further being rated at a lower power dissipation capacity with respect to said second value of said second power capacity.

20. The hybrid energy system of claim 17, wherein said dynamic braking grid system with said lower power dissipation capacity is configured to dissipate energy generated by said traction motor system in excess of said third capacity of said energy storage medium.

21. The hybrid energy system of claim 17, wherein said energy storage medium is rated at a third capacity, said third capacity being sufficient to make up the difference between said first power capacity and said first value of said second power capacity.

22. A method for operating a hybrid energy system configured for propelling a trolley connected, off-highway vehicle, the method comprising:
determining the availability of a trolley line for providing primary electric power to a traction motor system of the trolley connected vehicle;
determining whether a power demand on said traction motor system exceeds the capacity of an energy storage medium of the system;
activating an engine for providing secondary electric power to said traction motor system if said primary electric power is not available and said power demand on said traction motor system exceeds the capacity of said energy storage medium, the engine not being mechanically coupleable to drive wheels of the vehicle;

determining whether a power demand on said traction motor system exceeds the capacity of primary power available from said trolley line if said engine is not activated;

determining whether said power demand on said traction motor system exceeds a first power capacity of said engine if said engine is activated to supply secondary electric power to said traction motor system; and supplementing said primary or said secondary electric power with captured electrical energy stored in said energy storage medium.

23. The method of claim 22, further comprising utilizing said energy storage medium for supplying tractive power if said trolley line is unavailable and said power demand on said traction motor system does not exceed the capacity of said energy storage medium.

24. The method of claim 22, wherein said captured electrical energy is generated by at least one of: said traction motor system in a dynamic braking mode of operation, said engine, and said trolley line.

25. The method of claim 22, wherein said traction motor system is rated at a second power capacity exceeding said first power capacity, said second power capacity corresponding to a load carrying capacity of the off-highway vehicle.

26. The method of claim 25, wherein said energy storage medium is rated at a third capacity, said third capacity being sufficient to make up the difference between said first power capacity and said second power capacity.

27. The method of claim 22, further comprising:

storing dynamic braking energy within said energy storage medium up to said capacity thereof;

determining the availability of said trolley line to receive dynamic braking energy, in excess of said storage medium capacity, generated during a dynamic braking mode of operation;

directing said excess dynamic braking energy onto said trolley line to the extent said trolley line is capable of receiving said excess dynamic braking energy; and dissipating dynamic braking energy in excess of said trolley line capability within a dynamic braking grid system.

28. The method of claim 22, further comprising:

determining whether dynamic braking energy generated during a dynamic braking mode of operation exceeds an energy storage capacity of a energy storage medium included within the hybrid energy system; and dissipating dynamic braking energy in excess of said energy storage medium capacity of said hybrid energy system within a dynamic braking grid system.

29. The method of claim 28, wherein said energy dissipation capacity of said dynamic braking grid system is selected to be less than an energy generation capacity of said traction motor system during said dynamic braking mode of operation.

30. An energy system for propelling an off-highway vehicle, comprising:

an engine configured to generate electrical power, the engine not being mechanically coupleable to drive wheels of the vehicle;

an energy storage medium configured for receiving electrical power from the engine and providing primary electric power; and a traction motor system configured for receiving said primary electric power and for propelling the off-highway vehicle in response to said primary electric power, and said traction motor system further including a dynamic braking mode of operation;

wherein said energy storage medium is further configured for capturing electrical energy generated by said traction motor system in said dynamic braking mode of operation.

* * * * *